US011196763B2

(12) United States Patent
Rice

(10) Patent No.: US 11,196,763 B2
(45) Date of Patent: Dec. 7, 2021

(54) EDGE-COMPUTING-BASED ARCHITECTURES FOR MULTI-LAYERED FRAUD MITIGATION

(71) Applicant: Bank of America Corporation, Charlotte, NC (US)

(72) Inventor: Christopher L. Rice, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 321 days.

(21) Appl. No.: 16/459,816

(22) Filed: Jul. 2, 2019

(65) Prior Publication Data

US 2021/0006588 A1 Jan. 7, 2021

(51) Int. Cl.
*H04L 29/06* (2006.01)
*G06F 16/23* (2019.01)
*G06Q 20/40* (2012.01)

(52) U.S. Cl.
CPC ...... *H04L 63/1441* (2013.01); *G06F 16/2379* (2019.01); *G06Q 20/4016* (2013.01); *H04L 63/1416* (2013.01); *H04L 63/1425* (2013.01)

(58) Field of Classification Search
CPC .. G06F 16/2379; G06Q 20/4016; G07G 3/00; H04L 2209/38; H04L 2209/56; H04L 63/0227; H04L 63/1416; H04L 63/1425; H04L 63/1441; H04L 9/3239; H04W 12/122; H04W 4/70
See application file for complete search history.

(56) References Cited

U.S. PATENT DOCUMENTS

| 8,243,596 B2 | 8/2012 | Fedders et al. |
| 8,244,874 B1 | 8/2012 | Thireault |
| 8,489,113 B2 | 7/2013 | Walter et al. |
| 9,900,725 B2 | 2/2018 | Young et al. |
| 10,156,842 B2 | 12/2018 | Wu et al. |
| 2005/0010797 A1 | 1/2005 | Rushworth |

(Continued)

OTHER PUBLICATIONS

Search Query Report from IP.com (performed Oct. 20, 2021) (Year: 2021).*

(Continued)

*Primary Examiner* — Sharon S Lynch
(74) *Attorney, Agent, or Firm* — Weiss & Arons LLP; Michael A. Springs, Esq.

(57) ABSTRACT

Aspects of the disclosure relate to edge-computing ("EC")-based systems and methods for fraud mitigation. The systems and methods may utilize a multi-layer architecture. The architecture may include a set of N gatekeeper units, and each gatekeeper unit may be associated with an EC device. When a transaction request is received, the request may be processed at a first gatekeeper unit, and, if validated, successively processed by the set of N gatekeeper units. If any gatekeeper unit flags the request as suspicious, the unit may emit an audible alert that may be sensed by the associated EC device. The EC device may transmit a signal to one or more of the other gatekeeper units to perform additional processing for the request. When the request reaches the $N^{th}$ gatekeeper unit and achieves validation, the transaction may be executed via a central server connected to a transaction network.

16 Claims, 4 Drawing Sheets

(56) References Cited

U.S. PATENT DOCUMENTS

| | | | |
|---|---|---|---|
| 2006/0277187 A1* | 12/2006 | Roese | H04L 63/0492 |
| 2006/0282660 A1* | 12/2006 | Varghese | G06Q 20/4016 |
| | | | 713/155 |
| 2008/0155094 A1* | 6/2008 | Roese | H04L 63/107 |
| | | | 709/224 |
| 2016/0182561 A1* | 6/2016 | Reynolds, II | H04L 63/1466 |
| | | | 726/1 |
| 2017/0026193 A1* | 1/2017 | Thompson | G08B 27/005 |
| 2018/0121891 A1 | 5/2018 | Hosny et al. | |
| 2018/0167445 A1 | 6/2018 | Speight et al. | |
| 2018/0367314 A1 | 12/2018 | Egner et al. | |
| 2019/0026450 A1 | 1/2019 | Egner et al. | |
| 2019/0042955 A1 | 2/2019 | Cahill et al. | |
| 2019/0349426 A1* | 11/2019 | Smith | H04W 4/70 |
| 2020/0348662 A1* | 11/2020 | Cella | G05B 23/024 |
| 2020/0389469 A1* | 12/2020 | Litichever | H04L 63/1425 |
| 2021/0144517 A1* | 5/2021 | Guim Bernat | G06F 11/3006 |
| 2021/0314143 A1* | 10/2021 | Conner | H04L 9/3239 |

OTHER PUBLICATIONS

Mary Shacklett, "Edge Computing: A Cheat Sheet," https://www.techrepublic.com/article/edge-computing-the-smart-persons-guide/, Jul. 21, 2017.

Paul Miller, "What is Edge Computing?" https://www.theverge.com/circuitbreaker/2018/5/7/17327584/edge-computing-cloud-google, May 7, 2018.

"What is Edge Computing," https://www.ge.com/digital/blog/what-edge-computing, GE Digital, Retrieved on May 16, 2019.

\* cited by examiner

EDGE-COMPUTING-BASED ARCHITECTURES FOR MULTI-LAYERED FRAUD MITIGATION

FIELD OF TECHNOLOGY

Aspects of the disclosure relate to digital architectures. Specifically, aspects of the disclosure relate to digital architectures for mitigating fraudulent transactions.

BACKGROUND OF THE DISCLOSURE

Digital transactions play a critical role in the global socioeconomic ecosystem. Digital transactions are widely used by many entities and individuals, and are utilized for matters relating to personal, business, governmental, military, and nearly every other type of activity.

Digital transactions are susceptible to fraudulent activity. For example, a fraudulent actor may attempt to initiate a new transaction, or reroute an existing transaction, to receive items they are not authorized to receive. A fraudulent actor may be a hacker who hacks in to a computer system associated with digital transactions. A fraudulent actor may be an individual who deceives another individual to initiate or reroute the transaction. For example, a fraudulent actor may physically enter a bank branch and deceive an associate into arranging a wire transfer to the actor's account from another unsuspecting account whose owner did not authorize the transfer.

Typically, fraudulent transactions may not be detected until at least hours or days after being initiated. The party that was deceived may, for example, notice the unauthorized transaction. By the time the fraud was noticed, however, the transaction may have been completed, and it may be difficult to reverse the transaction and recover the items that were erroneously transferred.

It would be desirable, therefore, to provide automated systems and methods for detecting fraudulent activity associated with transactions. Furthermore, it would be desirable for the systems and methods to perform the detection with relatively low latency. Automated systems for fraud detection, however, may utilize a large amount of system resources. It would therefore be further desirable for the provided systems and methods to perform the detection efficiently, with minimal cost to system resources.

SUMMARY OF THE DISCLOSURE

Aspects of the disclosure relate to systems and methods for fraud-resistant transaction processing and execution. A method may include receiving a request to execute a transaction. The method may include screening the request via an N-tiered set of N gatekeeper units. Each of the gatekeeper units may include a processor, an audio emitter, and an associated edge-computing ("EC") device. The EC device may include a processor, an audio sensor, and a communication element for communicating with other gatekeeper units.

The screening may include processing the request successively via the set of N gatekeeper units. Processing the request at a gatekeeper unit may include performing a validation check for the request at the gatekeeper unit. Processing the request at a gatekeeper unit may result in the request being validated by the gatekeeper unit. When the request is validated by any one gatekeeper unit, successive processing may include relaying the request to the next tier gatekeeper unit for processing. The successive processing may continue until the request is either flagged as suspicious or relayed to the Nth gatekeeper unit.

When the request is flagged as suspicious during processing at one of the gatekeeper units, the method may include emitting, via the audio emitter of the gatekeeper unit at which the request was flagged, a predetermined audible alert. When the alert is sensed by the EC device associated with the gatekeeper unit at which the request was flagged, the method may include transmitting, via the EC device, a signal to one or more other gatekeeper units from the set of N gatekeeper units. The signal may instruct the other gatekeeper units to perform an advanced validation check.

When the request is relayed to the Nth gatekeeper unit and achieves validation, the method may include executing the transaction via a central server that is configured to connect the screening module to a transaction network.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
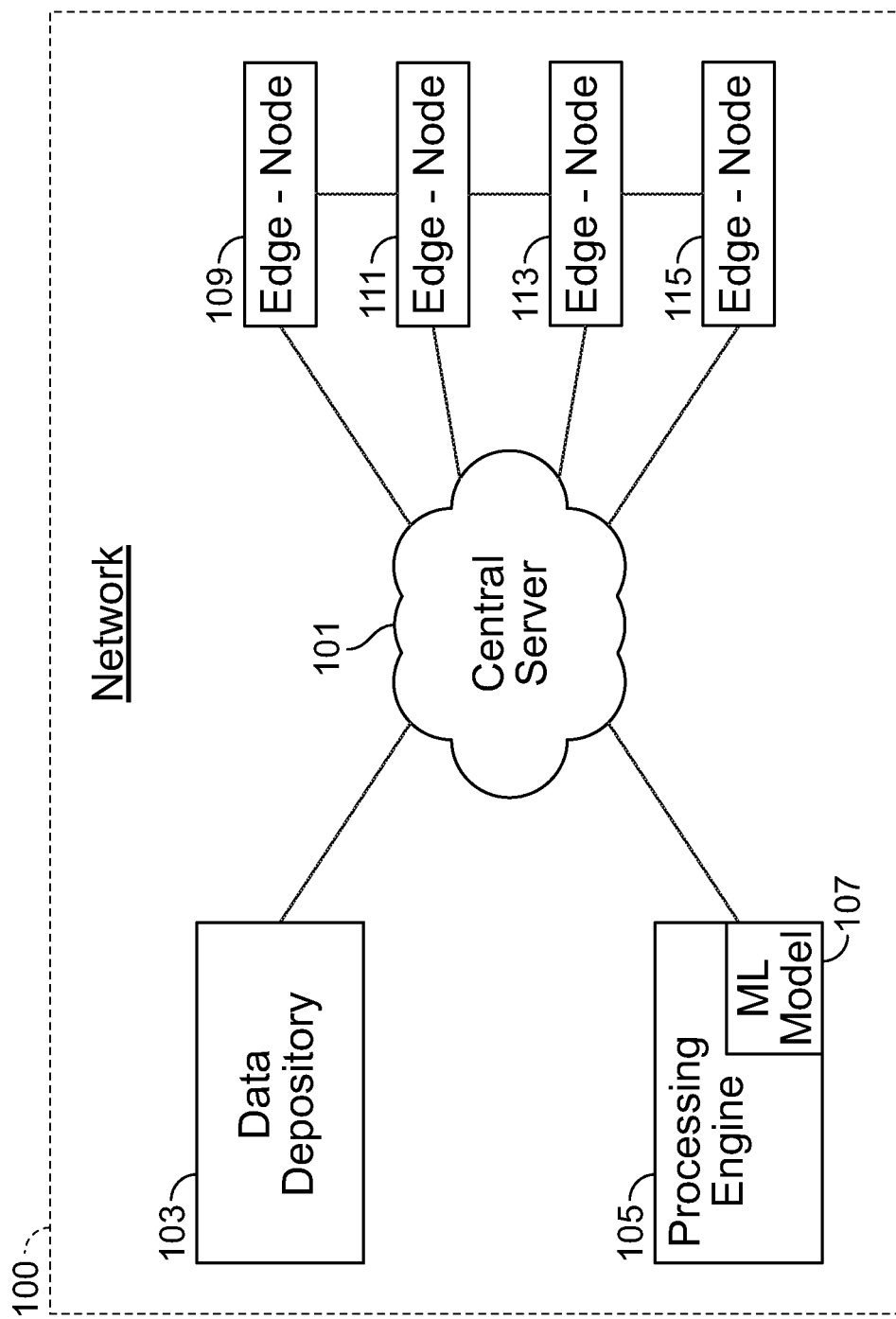
FIG. 1 shows an illustrative network architecture in accordance with principles of the disclosure.

Aspects of the disclosure relate to systems and methods for fraud-mitigating architectures. The architectures may utilize edge-computing. The architectures may include one or more edge-nodes (alternatively referred to herein as edge-computing ("EC") devices).

Edge-computing as used herein refers to computing networks and environments that utilize elements, or nodes, at the logical edge of the network. The logical edge of a network may include portions of the network that are at, or close to, the interface with the environment outside of the network.

An edge-node may be a node on the periphery or edge of a network. An illustrative network may be an internet-of-things ("IoT") network. An IoT network may include one or more nodes. Each node may include two or more nodes.

A node may include, or may be, a sensor. A sensor may detect changes in attributes of a physical or virtual operating environment. For example, sensors may measure attributes such as audio, rainfall, movement, temperature, water levels, human activity, or activity of other sensors. Sensors may measure electronic network traffic, customer traffic, resource usage, electronic signals (e.g., input or output) or frequency of user logins within a predefined geographic area.

Nodes may be any suitable size. For example, nodes may be a few millimeters in size. Nodes may be deployed in a wide variety of locations. For example, sensors may be deployed in military battlefields, industrial plants, in orchards, in clothing, automobiles, smartphones, jewelry, refrigerators, institutions, or any other suitable location.

Sensors may be relatively inexpensive and have low energy consumption. Sensors may "sense" two or more stimuli or environmental attributes.

Nodes may implement two or more functions. For example, sensors may measure changes in their operating (physical or virtual) environment, capture data corresponding to the measured changes and store/communicate the captured data. Sensors may be accessed by other sensors or other nodes on the network.

A node may include, or may be, an actuator. For example, based on data captured by a sensor, an actuator may respond to a detected event. Based on the capture and analysis of multiple sources of data (e.g., captured by sensors), an actuator may be instructed to take action autonomously, without human intervention.

Actuators may respond to data transmitted or processed by other nodes. Actuators may include devices that modify the physical state of a physical entity. Actuators may include devices that modify a virtual state of information. Actuators may move (translate, rotate, etc.) physical objects or activate/deactivate functionalities of physical objects.

For example, actuators may dim a light bulb, open a door, change a temperature setting, authorize access to an ATM and/or any other suitable functionality. Actuators may push notifications or redistribute resources. For example, notifications may route resource consumers (e.g., customers) to a location that has available resources to service the consumption.

Within an IoT environment, sensor nodes may perform the functions of input devices—they serve as "eyes" collecting information about their native operating environment. In contrast, actuator nodes may act as "hands" implementing decisions based on data captured by the sensor nodes. A single node may include the functions of sensors and actuators.

Nodes may include an application programming interface ("API") for communicating with other nodes. Nodes may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision-making and communication processes for actuators.

Nodes may store captured data locally. For example, nodes may store captured data in on-board transitory and/or non-transitory computer readable media. A node may transmit data. Data captured by a node may be transmitted to another node. A node may transmit data to a network core.

The network core may process the data. For example, multiple sensors may transmit captured data to a cloud computing environment. The cloud computing environment may itself include multiple nodes, such as computer servers or other computer systems. Nodes of the cloud computing environment may be networked to each other.

The cloud computing environment may process data that was captured by other nodes far from the location where the data was generated. For example, captured data may be transmitted from one node to another node until the captured data reaches a centrally located data repository.

Data captured by nodes in an operating environment may be voluminous and complex (e.g., structured/unstructured and/or constantly changing). Traditional data processing application software may be inadequate to meaningfully process the voluminous and complex data (e.g., "big data").

A cloud computing environment may include software applications specially designed to process large volumes of data ("big data analytics").

Nodes may communicate with other nodes directly, without transmitting information to an intermediary node or central server, such as a cloud computing environment. Data may be transmitted by a node using any suitable transmission method. For example, data captured by a node may be transmitted from a smartphone via a cellular network. Nodes may leverage a communication link provided by a smartphone to communicate captured data to other nodes.

As a result of the disparate nature of nodes, a networked operating environment may support a variety of communication protocols. Illustrative supported protocols may include HyperText Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, and IEEE 802.11 based protocols. For example, ZigBee is particularly useful for low-power transmission and requires approximately 20 to 60 milli-watts ("mW") of power to provide 1 mW transmission power over a range of 10 to 100 meters and a data transmission rate of 250 kilo-bits/second.

To further conserve energy, a node may communicate wirelessly for short periods of time. Utilizing this approach, one or more standard size single cell dry batteries (e.g., AA size) may provide a node with requisite computing power and wireless communication for many months.

Communication protocols used by nodes may not have, or may not be capable of having, security capabilities. A security layer or buffer may be implemented by nodes that receive or rely on data captured by unsecured sensors. Nodes may be dynamically connected or disconnected from a group or consortium. A security layer or buffer may be modular and scalable in order to meet network node growth/contraction requirements.

A physical layer may link nodes within a network. The physical layer may provide data ports and communication pathways to move data between multiple sub-networks and nodes. Such communication pathways may be wired or wireless. Exemplary wireless communication pathways may include Ethernet, Bluetooth, Wi-Fi, 3G, 4G, 5G and any other suitable wired or wireless broadband standards. Illustrative data ports of nodes may include hardware and/or software for receiving and/or transmitting data using any suitable communication pathway.

Each node may be assigned a unique identifier. For example, nodes may be identified by one or more radio frequency identification ("RFID") tags. The RFID tag may be stimulated to transmit identity information about the node or any other information stored on the RFID tag. Nodes may be identified by an Internet Protocol ("IP") address. Nodes may be identified based on a user. For example, a smartphone may be a node identified based on a user that successfully inputs biometric credentials.

Nodes may be positioned in, and capture data from, diverse operating environments. Operating environments may include geographic locations or virtual locations on electronic networks. Captured data may be transmitted to a location where information is needed for decisioning or consumption. Such a location may not be the same location where the data was captured or generated. Data synchronization protocols and caching techniques may be deployed across an IoT network to facilitate transmission of data, or delivery of data to, any desired node.

For example, a location where data is captured may not have continuous, reliable network connectivity. Accordingly, captured data may be stored locally on a node until a network connection is available to transmit or broadcast the captured data to another node.

Nodes may be grouped. Nodes may be grouped based on physical proximity or based on the content (or expected content) of data captured by the sensor. Nodes may be grouped based on detected movement of a node. For example, nodes may be affixed to vehicles or other moveable objects. Such nodes may move in or out of a network. Nodes within a geographic area may be grouped based on their presence within the geographic area. For example, nodes in and/or around a room, building, or institution, or a portion thereof, may form a group. Nodes may be grouped based on their expected trajectory. Nodes may be grouped based on whether they are resource consumers or providers. Nodes may be grouped based on expected resource consumption. Nodes may be grouped virtually. Grouped nodes may form a sub-network.

Contextually, data captured by nodes may provide information not only about the native (physical or virtual) operating environment surrounding a node, but data captured by multiple nodes may provide data that signifies occurrence of an event. The data may be analyzed by a cloud computing environment. Analytical tools (e.g., big data analysis techniques) may detect, within the data, occurrence of an event that triggers actuator nodes to take responsive action.

Advances in embedded systems, such as System-on-a-Chip (SoC) architectures, have fueled development of nodes that are powerful enough themselves to run operating systems and complex data analysis algorithms. An illustrative SoC may include a central processing unit ("CPU"), a graphics processor unit ("GPU"), memory, power management circuits, and a communication circuit. Within an operating environment, such nodes may be positioned closer (relative to the cloud computing environment) to other data gathering nodes such as sensors. Nodes positioned close to the source of generated data and having sufficient computational power to process the data may be termed "edge-nodes." Edge-nodes may integrate sensing capabilities, actuating capabilities, data connectivity and/or computing capacities.

Edge-nodes may control sensors, actuators, embedded devices and other nodes. Edge-nodes, or the nodes they control, may not be continuously connected to a network. Edge-nodes may provide computational resources positioned near the source of captured data or near an operating environment. Processing data using edge-nodes may reduce the communication bandwidth needed to transmit data from a node to a cloud computing environment.

For example, a sensor deployed in a windfarm turbine may detect changes in wind speed or wind direction. Typically, the sensor may transmit the detected changes to a remote cloud computing environment. The remote cloud computing environment may process data received from the node (and other nodes) and issue instructions to adjust a position of the turbine in response to the detected changes. However, communication with, and processing by, the cloud computing environment may inject additional latency before the turbines are adjusted in response to the sensed changes.

By running data analytics and processing closer to the originating source of data, actuator response times may be improved. Edge-nodes embedded in the turbine may include sufficient processing power to analyze sensed data and adjust turbines with less latency (perhaps even in close to real-time) and thereby optimize electricity production of the turbine.

In addition to providing faster response time to sensed changes, processing data using edge-nodes may reduce communication bandwidth requirements and improve overall data transfer time across a network. Furthermore, less frequent data transmissions may enhance security of data gathered by nodes. Frequent data transfers may expose more data to more potential security threats. For example, transmitted data may be vulnerable to being intercepted en-route to the cloud computing environment.

Additionally, edge-nodes may be tasked with decision-making capabilities. Edge-nodes may discard non-essential data generated by sensors. Such disregarded data may never be transmitted or stored in the cloud computing environment, further reducing exposure of such data to security threats.

For example, a network of security cameras (e.g., sensor nodes) may generate large amounts of video data. Transmitting such large amounts of data to a cloud computing environment may utilize significant bandwidth—possibly preventing the cloud computing environment from timely receiving other data. Edge-nodes may analyze the video data at the source, before transmitting the data to the cloud computing environment. The analysis by the edge-nodes may identify "important" video footage and discard the rest. Only the important video footage may be transmitted to the cloud computing environment, reducing network congestion.

Often, instructions to actuators need to be issued in milliseconds or faster. Round-trip communication to a cloud computing environment introduces undesirable latency. For some applications, necessary reliability and critical-path control management make it undesirable to wait for the cloud computing environment to process data and issue responsive instructions.

For example, an anti-collision algorithm for an autonomous vehicle may be executed by the cloud computing environment. However, it would be faster and more reliable for such anti-collision algorithms to be run by edge-nodes. Furthermore, the anti-collision data may have short-term value and it would therefore be undesirable to regularly transmit that data to the cloud computing environment.

Some nodes may be deployed in areas with poor network connectivity. For example, industries such as mining, oil/gas, chemicals and shipping may not be well served by robust affordable communication infrastructure. Incorporating edge-nodes may allow networks associated with these industries to process data without robust communication infrastructure.

Smartphones may not have access to a data connection. Edge-nodes may allow a cached version of a website to be opened on a smartphone, without an internet connection. Data may be entered into the website and changes saved locally to the edge-node (e.g., the smartphone itself). The edge-node may sync changes with the cloud computing environment when a data connection is available. Aggregated sensor data may be transmitted to the cloud computing environment at designated times, such as when network bandwidth is underutilized.

Utilizing edge-nodes to process data may improve security of a network. For example, a network breach may be detected by an edge-node. The intrusion may be quarantined by or at the edge-node and prevent the breach from compromising the entire network.

Edge-nodes may run encryption algorithms and store biometric information locally. Such dispersion of security protocols may reduce the risk of any user's security information being comprised. Utilizing edge-nodes may disperse processing power needed to run the security or encryption algorithms.

Utilizing edge-nodes may improve reliability of a network. For example, edge-nodes with machine learning capabilities may detect operational degradation in nodes, equipment, and infrastructure deployed within an operating environment. Early detected degradation may be cured before developing into full-blown failures.

Generally, edge-nodes may include a processor circuit. The processor circuit may control overall operation of an edge-node and its associated components. A processor circuit may include hardware, such as one or more integrated circuits that form a chipset. The hardware may include digital or analog logic circuitry configured to perform any suitable (e.g., logical) computing operation.

An edge-node may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, computer executable instructions, electronic signatures of biometric features, or any other suitable information or data structures. Components of a node may be linked by a system bus, wirelessly or by other suitable interconnections. Edge-node components may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more speakers for providing audio output and a video display for providing textual, audiovisual and/or graphical output.

Software applications may be stored within the non-transitory memory and/or other storage medium. Software applications may provide instructions to the processor that enable an edge-node to perform various functions. For example, the non-transitory memory may store software applications used by an edge-node, such as an operating system, application programs, and an associated database. Alternatively, some or all of computer executable instructions of an edge-node may be embodied in hardware or firmware components of the edge-node.

Software application programs, which may be used by an edge-node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

An edge-node may support establishing network connections to one or more remote nodes. Such remote nodes may be edge-nodes, sensors, actuators or other computing devices. Edge-nodes may be personal computers or servers. An edge-node may communicate with other nodes using a data port. The data port may include a network interface or adapter. The data port may include a communication circuit. An edge-node may include a modem, antenna or other communication circuitry for establishing communications over a network, such as the Internet. The communication circuit may include the network interface or adapter. The communication circuit may also include the modem.

Via the data port and associated communication circuitry, an edge-node may access network connections and communication pathways external to the edge-node. Illustrative network connections may include a local area network ("LAN") and a wide area network ("WAN"), and may also include other networks. Illustrative communication pathways may include Wi-Fi, wired connections, Bluetooth, cellular networks, satellite links, radio waves, fiber optic, or any other suitable medium for carrying signals.

The existence of one or more well-known protocols such as TCP/IP, Ethernet, FTP, and HTTP is presumed, and a node can be operated in a client-server configuration to permit a user to retrieve web pages from a web-based server. Web browsers can be used to display and manipulate data on web pages.

Edge-nodes may include various other components, such as a display, battery, speaker, and antennas. Edge-nodes may be portable devices such as a laptop, tablet, smartphone, other "smart" devices (e.g., watches, eyeglasses, clothing having embedded electronic circuitry), or any other suitable device for receiving, storing, transmitting and/or displaying electronic information.

An edge-node may include a display constructed using organic light emitting diode ("OLED") technology. OLED technology may enhance functionality of an edge-node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing edge-nodes that consume less power for their basic functionality and allow any residual available power to provide enhanced security and functionality. Illustrative devices that may be constructed using OLED technology are disclosed in commonly assigned U.S. Pat. No. 9,665,818, which is hereby incorporated by reference herein in its entirety.

An edge-node may be, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Edge-nodes may utilize computer-executable instructions, such as program modules, executed by a processor. Software applications may include multiple program modules. Generally, program modules include routines, programs, objects, components, data structures, etc. that perform particular tasks or implement particular abstract data types. An edge-node may be operational with distributed computing environments where tasks are performed by remote processing devices that are linked through a communications network. In a distributed computing environment, program modules may be located in both local and remote computer storage media including memory storage devices. Edge-nodes may interact with a network of remote servers hosted on the Internet to store, manage, and process data (e.g., a cloud computing environment).

An edge-node may receive and/or transmit data in real-time or at pre-defined intervals, such as once a day. The edge-node may filter data captured by one or more nodes. The edge-node may repackage or reformat captured data.

Edge-nodes may include a battery. The battery may be a power source for electronic components of the edge-node. For example, the battery may supply power to the display, the communication circuit, and the processor circuit. In some embodiments, an edge-node may include a plurality of batteries. Edge-nodes may include solar panels that convert solar energy into electricity that power one or more components of an edge-node.

A method for fraud-resistant transaction processing and execution is provided. The method may include receiving a request to execute a transaction. The request may be received digitally, e.g., via an online portal or alternatively in-person, e.g., via an associate at a financial institution. The transaction may involve a transfer of ownership. The transaction may be financial. The transaction may be a wire transfer, a trade, a purchase, or any other suitable transaction.

The method may include screening the request via an N-tiered set of N gatekeeper units. For example, the set may include four gatekeeper units associated with tiers one through four, respectively. The set may include 2, 3, 5, 7, 10 or any other suitable number of units, and be associated with a corresponding number of tiers. Each tier may be responsible for a specific, predetermined, level or task within the screening process, and the gatekeeper unit associated with the tier may execute that level or task. In another embodiment, the number of units may be greater than the number of tiers, and more than one unit may be associated with the same tier. In this embodiment, the multiple units within a tier may, collaboratively or redundantly, execute the level or task associated with that tier.

Each of the gatekeeper units may include a processor, an audio emitter, and an associated edge-computing ("EC") device. The associated EC device may be positioned proximal to the gatekeeper unit. The associated EC device may be attached to the gatekeeper unit. The associated EC device may be within a predetermined distance from the gatekeeper unit. The distance may be six inches, a foot, five feet, within sensor range of a particular emitter, or any other suitable position. The EC device may include a processor, an audio sensor, and a communication element for communicating with other gatekeeper units.

The screening may include processing the request successively via the set of N gatekeeper units. Processing the request at a gatekeeper unit may include performing a validation check for the request at the gatekeeper unit. A validation check may include any suitable computer-based process for verifying the validity of a transaction request. For example, a validation check may include searching databases of known suspicious elements against the information contained in the transaction request. The elements may include transacting parties, account numbers, amounts, transaction types, profiles, and/or patterns across multiple transactions and transaction requests.

Processing the request at a gatekeeper unit may result in the request being validated by the gatekeeper unit. When the request is validated by any one gatekeeper unit, successive processing may include relaying the request to the next tier gatekeeper unit for processing. The successive processing may continue until the request is either flagged as suspicious or relayed to the Nth gatekeeper unit.

Some embodiments may include executing the processing at each gatekeeper unit with an increasingly high validation threshold for each successive tier. The increasingly high threshold may be more resource-intensive. For example, the first tier may perform a basic check—such as running the transacting parties against a database of known suspicious parties. This may easily flag a percentage of requests while using minimal resources. The second tier may perform a more complex check—such as checking an overall transaction profile against historical transactional data to detect suspicious patterns. The validation check at the second tier may use more resources (e.g., memory, processing power, etc.) than the basic check at the first tier. Thus, the multi-tier process may reduce resource utilization by applying low-resource options first, and incrementally increasing resource utilization on-demand.

In other embodiments, the validation threshold for each successive tier may not be increasingly high. The validation thresholds may be the same. The validation thresholds may be different. The validation thresholds may fluctuate. The validation thresholds may decline with each successive tier. The validation checks at the different tiers may be merely different from each other, and may represent a series of hurdles that a request must satisfy in order to be cleared. Sequence may not matter.

The request may be flagged as suspicious during processing at one of the gatekeeper units. When the request is flagged, the method may include emitting a predetermined audible alert via the audio emitter of the gatekeeper unit at which the request was flagged.

In certain embodiments, the gatekeeper units may include any other suitable emitters, and the EC devices may include corresponding sensors. For example, the gatekeeper units may include a light (visible or otherwise, e.g., infrared) emitter, and the EC devices may include a corresponding light sensor. In these embodiments, the alert may be light-based.

Certain embodiments may further include selecting the alert from a plurality of alert options. Each alert option may correspond to a level of alert intensity. Alert intensity may include one or more factors such as immediacy (i.e., how soon the fraud may be realized), severity (i.e., quantity or value of items at risk), suspicion level (i.e., level of confidence that the fraud will occur), surrounding population (i.e., how many and how near are human bystanders who may detect the alert and assist—e.g., if people are further away, it may be advantageous for the alert to be louder) or any other suitable factors that may contribute to a level of alert intensity.

The alert options may each be uniquely identifiable. For example, when the alert is an audible alert, each alert option may be a different noise, ring, sound, volume, or in some other way distinguishable from the other alert options. When the alert is a visual alert, each alert option may be a different color, pattern, brightness, or in some other way distinguishable from the other alert options.

Emitting an audible alert (or light-based, or other suitable alert) may have the advantage of alerting a human bystander to the threat. For example, the set of gatekeeper units may be positioned near one or more associates of an entity that is involved with the transaction. Thus, the audible alert may serve a dual purpose of disseminating the alert to other units and simultaneously to nearby humans who may provide back-up, redundancy, advisory, and/or any other suitable assistance in responding to the flagged request.

In some embodiments, the emitter may emit the alert once. In other embodiments, the emitter may emit the alert a predetermined number of times. In yet other embodiments, the emitter may periodically, or substantially continuously, emit the alert. The emitter may emit the alert until confirmation is received that the alert was detected.

The alert may be sensed by the EC device associated with the gatekeeper unit at which the request was flagged. When the alert is sensed by the EC device, the method may include transmitting, via the EC device, a signal to one or more other gatekeeper units from the set of N gatekeeper units. The signal may instruct one or more of the other gatekeeper units to perform an advanced validation check.

In some embodiments, the one or more other gatekeeper units to which the EC device transmits the signal may include the gatekeeper units associated with a tier that is upstream (i.e., a lower tier, that is closer to the first unit that processed the request) from the tier of the gatekeeper unit that flagged the request.

In certain embodiments, the one or more other gatekeeper units to which the EC device transmits the signal may include the gatekeeper units associated with a tier that is downstream from the tier of the gatekeeper unit that flagged the request.

In some embodiments, the one or more other gatekeeper units to which the EC device transmits the signal may include all the other gatekeeper units in the set of N gatekeeper units.

The advanced validation check performed by each of the one or more other gatekeeper units may include repeating the initial validation checks performed by that gatekeeper unit. The advanced validation check may be associated with a higher level of security than the initial validation checks performed by the gatekeeper unit. The advanced validation check may include performing the validation check on a larger body of data. The advanced validation check may include performing the validation check with a list of queries that is more extensive than a list of queries that may have been used for the initial validation check. The advanced validation check may also include requesting manual intervention for further validation analysis.

There may, in certain embodiments, be a degree of individuality regarding the advanced validation checks. For example, certain tiers may perform advanced validation checks with a higher level of security. Others may maintain, or even lower, the level of security. Downstream tiers may be associated with certain types of advanced validation checks, and upstream tiers may be associated with others. Still other embodiments may include dynamic determination of the advanced validation check for each tier. The dynamic determination may be based on the particularities of the request, and/or the elements that caused the request to be flagged as suspicious in the first place.

The request may be relayed to the Nth gatekeeper unit and may achieve validation. Achieving validation may include a scenario in which the request was successively processed by the set of gatekeeper units without being flagged as suspicious by any of the gatekeeper units. Achieving validation may also include a scenario where the request was flagged as suspicious, but was validated via the advanced validation checks.

When the request is relayed to the Nth gatekeeper unit and achieves validation, the method may include executing the transaction. The transaction may be executed via a central server that is configured to connect the screening module to a transaction network. For example, when the transaction is a wire-transfer, the central server may connect the screening module to a wire-transfer network.

Certain embodiments may further include triggering, in response to the alert, a logging of the request in a logging module. The logging may also record metadata associated with the request. Logging the request and the associated metadata may be useful for predicting trends for future transaction requests.

Some embodiments may further include updating a profile of an initiator of the request. The updating may be triggered by the logging and may be based on information in the logging module. Based on the updated profile, the embodiments may include adjusting validation thresholds used in screening future requests initiated by the initiator. For example, if a certain initiator successfully executes one or more transactions that may otherwise be flagged as suspicious, the screening module may lower certain thresholds to allow similar future transactions without being flagged. Conversely, if an initiator abuses the system and fraudulent transactions are confirmed, validation thresholds may be raised which may result in making it more difficult, or even impossible, for that initiator to execute future transactions.

Certain embodiments may further include storing, at each of the gatekeeper units, a copy of a distributed ledger. The embodiments may also include updating the copy as the request is processed, flagged, and/or relayed by the gatekeeper units.

In certain embodiments, achieving validation may be based at least in part on a consensus derived from polling the set of gatekeeper units. The polling may include querying each unit for a confidence score regarding the request. The confidence score may be on a predetermined scale, e.g., 1-10 or 0-100. The confidence score may be binary. The confidence score may be based on the validation check and/or advanced validation check performed at the unit. The confidence score may be based at least in part on information stored in a distributed ledger that may be hosted by the unit. The consensus may be based on a predetermined threshold overall confidence score, e.g., an average of the individual scores. The consensus may be based on a majority of units that achieve a threshold confidence level validating the request.

A fraud-resistant system for transaction processing and execution is provided. The system may include a screening module. The screening module may include an N-tiered set of N gatekeeper units. Each gatekeeper unit may include a processor, an audio emitter, and an associated edge-computing ("EC") device. The EC device may include a processor, an audio sensor, and a communication element for communicating with other gatekeeper units.

The system may also include a central server. The central server may be configured to connect the screening module to a transaction network.

The screening module may be configured to chain-process a request that was received to execute a transaction. When chain-processing, the set of N gatekeeper units may be configured to successively process the request. Processing a request may include performing a validation check at a gatekeeper unit. When the request is validated by the first gatekeeper unit, the request may be successively relayed to the next tier gatekeeper unit for processing. The successive processing may continue until the request is either flagged as suspicious or relayed to the Nth gatekeeper unit.

When the request is flagged as suspicious during processing at one of the gatekeeper units, the gatekeeper unit at which the request was flagged may be configured to emit a predetermined audible alert. When the alert is sensed by the EC device associated with the gatekeeper unit at which the request was flagged, the EC device may be configured to transmit a signal to one or more other gatekeeper units from the set of N gatekeeper units. The signal may instruct the other gatekeeper units to perform an advanced validation check.

When the request is relayed to the Nth gatekeeper unit and achieves validation, the central server may be configured to execute the transaction.

A method for multi-layer transaction validation is provided. The method may include receiving a request to execute a transaction. The method may also include processing the request (i.e., performing a validation check) at a first gatekeeper unit. The gatekeeper unit may include a processor, an audio emitter, and an associated edge-computing ("EC") device. The EC device may include a processor, an audio sensor, and a communication element for communicating with other devices.

When the first gatekeeper unit validates the request, the method may include successively processing the request at each gatekeeper unit in a set of N gatekeeper units. When the request is validated at any of the gatekeeper units, the method may include relaying the request to the next gatekeeper unit until the request reaches the Nth gatekeeper unit. Some embodiments may include increasing a validation threshold for the processing that is executed at each subsequent gatekeeper unit.

When the request is flagged as suspicious during processing at one of the gatekeeper units, the method may include emitting, via the audio emitter of the gatekeeper unit, a predetermined audible alert. When the alert is sensed by the EC device associated with the gatekeeper unit, the method may include transmitting, via said EC device, a signal to one or more other gatekeeper units from the set of N gatekeeper units. The signal may instruct the other gatekeeper units to perform an advanced validation check.

When the request is relayed to the Nth gatekeeper unit and achieves validation, the method may include executing the transaction via a central server that is configured to connect the screening module to a transaction network.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows illustrative network architecture 100 according to aspects of the disclosure. Architecture 100 may include a central server 101. Central server 101 may be coupled with data depository 103. Central server 101 may be coupled with processing engine 105. Processing engine 105 may be operable with machine-learning ("ML") model 107. Some or all of architecture elements 101-107 may perform operations relating to deriving suspicious transaction request profiles based on historical data, logging data pertaining to current transaction requests, executing validated transactions via a transaction network, or any other suitable operation according to aspects of the disclosure.

Some or all of architecture elements 101-107 may be physically located in a central location. Some or all of architecture elements 101-107 may be logically centralized. Some or all of architecture elements 101-107 may be cloud-based.

Architecture 100 may include edge-nodes 109-115. Edge-nodes 109-115 may be devices at the network edge—i.e., devices at or near the interface with the environment outside of the network. Edge-nodes 109-115 may include devices (e.g., EC devices) that may be capable of generating, processing, and storing data at the edge, without relying on central server 101. Each of edge-nodes 109-115 may include a sensor, a processor, and a memory. One or more of edge-nodes 109-115 may be associated with a gatekeeper unit. One or more of edge-nodes 109-115 may be a gatekeeper unit.

Figure 2:
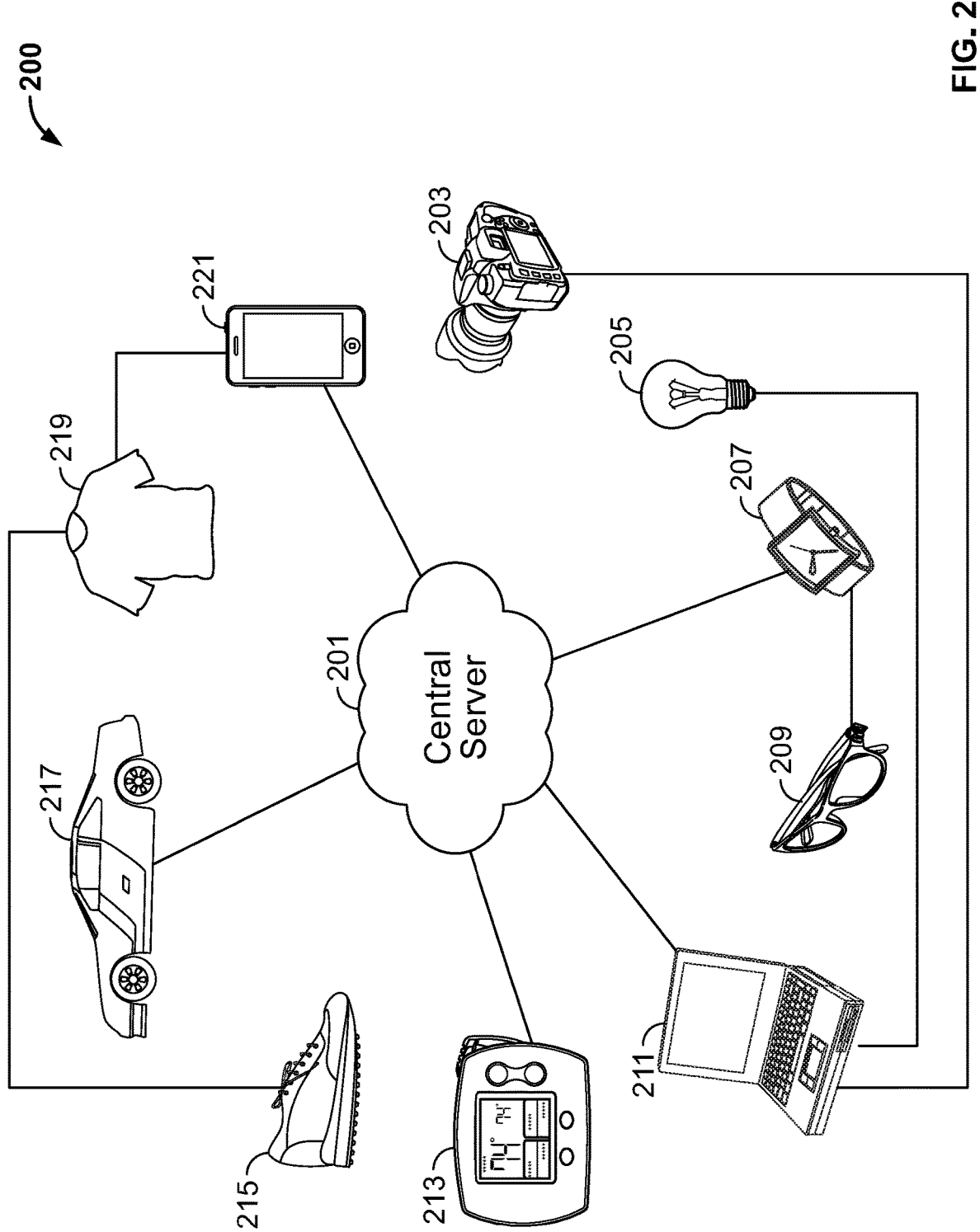
FIG. 2 shows another illustrative network architecture in accordance with principles of the disclosure.

FIG. 2 shows illustrative network architecture 200 according to aspects of the disclosure. Architecture 200 may include a central server 201. In some embodiments, architecture 200 may be a distributed network and may not include distinct central components.

Architecture 200 may include edge nodes 203-221. Edge nodes 203-221 depicted in FIG. 2 may include everyday items, such as a video camera, light bulb, smart watch, smart glasses, computer (e.g., laptop, desktop, tablet), smart thermostat, shoe, car, shirt, and smartphone, respectively. Each of edge-nodes 203-221 may include at least a sensor, a processor, and a memory. Each of edge-nodes 203-221 may be configured to communicate with other devices. Some of the nodes may communicate with the central server directly. Others may communicate with intermediate devices (intermediate devices may be referred to alternatively as edge servers) that may or may not then communicate with the central server. Architecture 200 shows connecting lines between edge-nodes 203-221 to show illustrative connective routes. For example, architecture 200 shows that while car 217 and computer 211 may be configured to communicate directly with central server 201, video camera 203 and light bulb 205 may be configured to communicate with the network via computer 211.

The EC devices according to the disclosure may include everyday devices such as those depicted in FIG. 2. In other embodiments, the EC devices according to the disclosure may include devices designed and/or installed, at least in part, for the purpose of the disclosed architecture.

Figure 3:
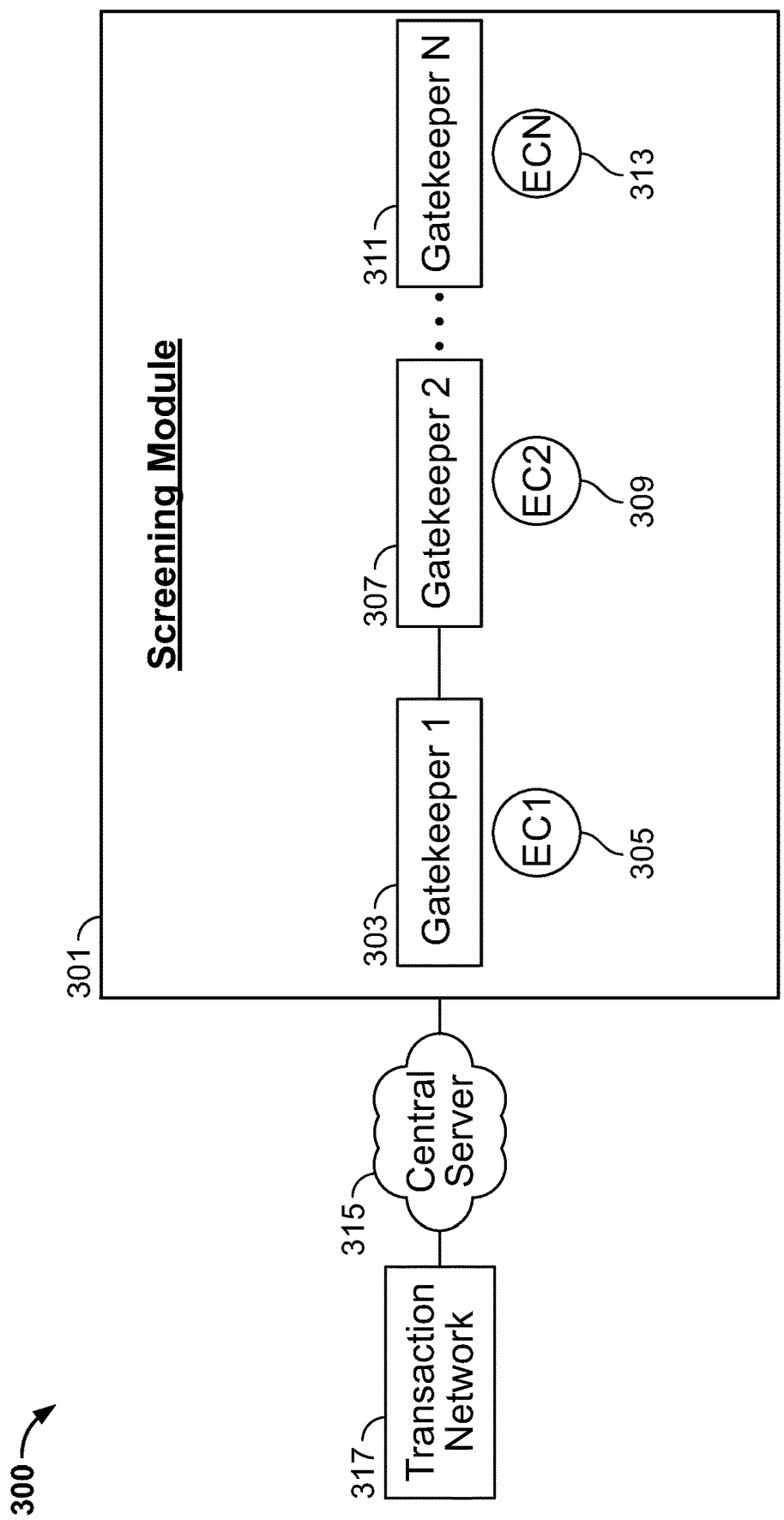
FIG. 3 shows an illustrative system architecture in accordance with principles of the disclosure.

FIG. 3 shows illustrative system architecture 300 according to aspects of the disclosure. Architecture 300 may include screening module 301. Screening module 301 may include a set of gatekeeper N units (303, 307, through 311). Each gatekeeper unit may be associated with an edge-computing (EC) device—i.e., Gatekeeper 1 (303) may be associated with EC device 1 (305), Gatekeeper 2 (307) may be associated with EC device 2 (309), all the way through Gatekeeper N (311) which may be associated with EC device N (313).

Architecture 300 may also include central server 315, which may connect screening module 301 to transaction network 317. The connection to transaction network 317 may facilitate execution of a transaction that is validated via screening module 301.

Figure 4:
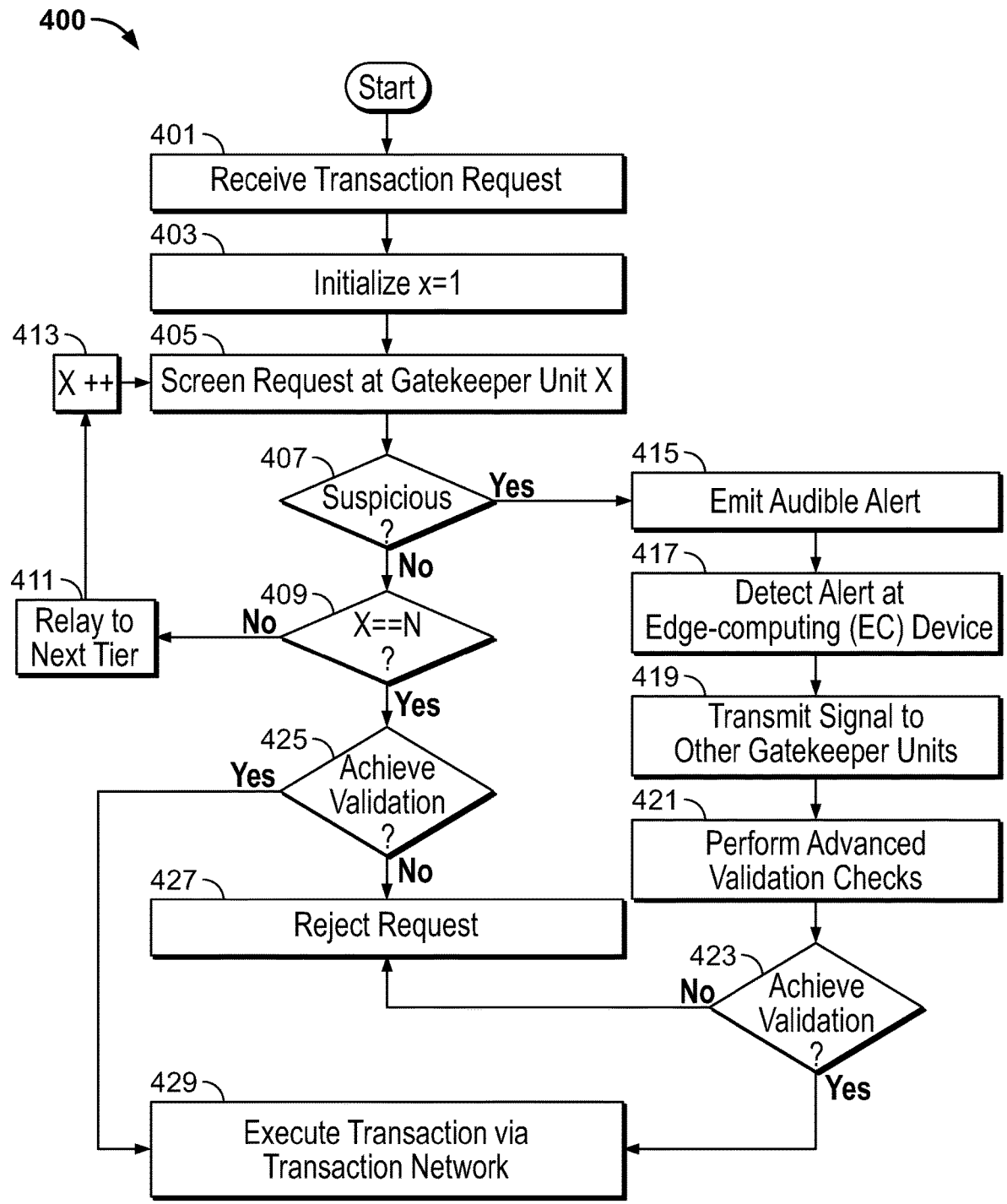
FIG. 4 shows an illustrative flowchart in accordance with principles of the disclosure.

FIG. 4 shows illustrative flowchart 400 according to aspects of the disclosure. Flowchart 400 shows steps of a logic flow according to one embodiment, other embodiments may include different steps and/or step sequences from those shown in flowchart 400.

Flowchart 400 begins with receiving a transaction request at step 401. The request may be processed successively via a set of N gatekeeper units. Successively processing the requests may begin with initializing the variable X to equal 1 at step 403. At step 405, the request is processed at gatekeeper unit X (initially equal to one). If the request is not flagged as suspicious as a result of the processing (step 407=No), and X is not equal to N (step 409=No, i.e., the current gatekeeper unit is not the last one), the request is relayed to the next tier (step 411), X is incremented by 1 (step 413), and the process loops back to step 405, where the request is processed at gatekeeper unit X.

When a request is flagged as suspicious during processing at any gatekeeper unit (step 407=yes), the gatekeeper unit may emit an audible alert (step 415). The alert may be detected at an associated edge-computing (EC) device (417). The EC device may transmit a signal to one or more other gatekeeper units (step 419). The other gatekeeper units may perform advanced validation checks (step 421).

The process may query whether the request achieved validation at the end of two tracks—at step 423, after the other gatekeeper units perform advanced validation checks, and at step 425, when X is equal to N (step 409=Yes, i.e., the current gatekeeper unit performing successive processing is the last unit in the set).

When the request does not achieve validation at steps 423 or 425, the transaction request may be rejected (step 427). When the request achieves validation at steps 423 or 425, the transaction may be executed via a transaction network (step 429).

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, edge-computing-based systems and methods for multi-layered fraud mitigation architectures are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for fraud-resistant transaction processing and execution, said method comprising:
   receiving a request to execute a transaction;
   screening the request via an N-tiered set of N gatekeeper units, each of the gatekeeper units comprising a processor, an audio emitter, and an associated edge-computing ("EC") device, said EC device comprising a processor, an audio sensor, and a communication element for communicating with other gatekeeper units, wherein said screening comprises processing the request successively via the set of N gatekeeper units, wherein processing comprises performing a validation check, and, when the request is validated by a first gatekeeper unit, successively relaying the request to the next tier gatekeeper unit for processing, wherein the processing executed at each gatekeeper unit corresponds to an increasingly high validation threshold for each successive tier and the successive processing continues until the request is either flagged as suspicious or relayed to the N' gatekeeper unit;
   when the request is flagged as suspicious during processing at one of the gatekeeper units:
      emitting, via the audio emitter of the gatekeeper unit at which the request was flagged, a predetermined audible alert; and
   when the alert is sensed by the EC device associated with the gatekeeper unit at which the request was flagged, transmitting, via said EC device, a signal to one or more other gatekeeper units from the set of N gatekeeper units, said signal instructing the other gatekeeper units to perform an advanced validation check; and
   when the request is relayed to the N' gatekeeper unit and achieves validation, executing the transaction via a central server that is configured to connect the screening module to a transaction network.

2. The method of claim 1, further comprising selecting the audible alert from a plurality of audible alert options, each option corresponding to a level of alert intensity.

3. The method of claim 1, wherein the one or more other gatekeeper units to which the EC device transmits the signal comprises the gatekeeper units associated with a tier that is upstream from the tier of the gatekeeper unit that flagged the request.

4. The method of claim 1, wherein the one or more other gatekeeper units to which the EC device transmits the signal comprises the gatekeeper units associated with a tier that is downstream from the tier of the gatekeeper unit that flagged the request.

5. The method of claim 1, wherein the one or more other gatekeeper units to which the EC device transmits the signal comprises all the other gatekeeper units in the set of N gatekeeper units.

6. The method of claim 1, further comprising triggering, in response to the alert, a logging of the request, along with metadata associated with the request, in a logging module.

7. The method of claim 6, further comprising:
updating a profile of an initiator of the request, said updating triggered by the logging and based on information in the logging module; and
based on the updated profile, adjusting validation thresholds used in screening future requests initiated by the initiator.

8. The method of claim 1, further comprising:
storing, at each of the gatekeeper units, a copy of a distributed ledger; and
updating the copy as the request is processed, flagged, and/or relayed by the gatekeeper units.

9. The method of claim 8, wherein the request achieves validation based on a consensus derived from polling the set of gatekeeper units.

10. The method of claim 1, wherein the transaction is a wire transfer.

11. A fraud-resistant system for transaction processing and execution, said system comprising:
a screening module comprising an N-tiered set of N gatekeeper units, each gatekeeper unit comprising:
a processor;
an audio emitter;
and an associated edge-computing ("EC") device, said EC device comprising a processor, an audio sensor, and a communication element for communicating with other gatekeeper units; and
a central server, said central server configured to connect the screening module to a transaction network;
wherein the screening module is configured to chain-process a request that was received to execute a transaction, said chain-processing wherein:
the set of N gatekeeper units is configured to successively process the request, wherein processing comprises performing a validation check, and, when the request is validated by a first gatekeeper unit, the request is successively relayed to the next tier gatekeeper unit for processing, wherein the processing executed at each gatekeeper unit is associated with an increasingly high validation threshold for each successive tier and the successive processing continues until the request is either flagged as suspicious or relayed to the Nth gatekeeper unit;
when the request is flagged as suspicious during processing at one of the gatekeeper units, the gatekeeper unit at which the request was flagged is configured to emit a predetermined audible alert, and, when the alert is sensed by the EC device associated with the gatekeeper unit at which the request was flagged, said EC device is configured to transmit a signal to one or more other gatekeeper units from the set of N gatekeeper units, said signal which instructs the other gatekeeper units to perform an advanced validation check; and
when the request is relayed to the Nth gatekeeper unit and achieves validation, the central server is configured to execute the transaction.

12. The system of claim 11, wherein the audible alert is selected from a plurality of audible alert options, each option corresponding to a level of alert intensity.

13. The system of claim 11, wherein the one or more other gatekeeper units to which the EC device is configured to transmit the signal comprises the gatekeeper units associated with a lower tier than the tier of the gatekeeper unit that flagged the request and/or the gatekeeper units associated with a higher tier than the tier of the gatekeeper unit that flagged the request.

14. The system of claim 11, further comprising a logging module, and wherein the alert triggers a logging of the request, along with metadata associated with the request, in the logging module.

15. The system of claim 11, further comprising a distributed ledger, wherein each of the gatekeeper units stores a copy of the ledger, and updates the copy as the request is processed, flagged, and/or relayed by the gatekeeper units.

16. The system of claim 11, wherein the transaction is a wire transfer.

* * * * *